Oct. 17, 1944.   J. N. DETRICK ET AL   2,360,479
CONDENSER DIELECTRIC AND METHOD OF MAKING
Filed July 10, 1942

INVENTOR
J. N. DETRICK
H. F. FRUTH
BY Harry C. Suft
ATTORNEY

Patented Oct. 17, 1944

2,360,479

UNITED STATES PATENT OFFICE 2,360,479

CONDENSER DIELECTRIC AND METHOD OF MAKING

Judson N. Detrick, Oak Park, and Hal F. Fruth, Elmhurst, Ill., assignors to Western Electric Company, Incorporated, New York, N. Y., a corporation of New York Application July 10, 1942, Serial No. 450,428

10 Claims. (Cl. 25—156)

This invention relates to a condenser dielectric and to a method of making the same, and more particularly, to a ceramic dielectric material for an electrostatic condenser and to a method of making the same.

In some types of electrostatic condensers, a paper or metallic foil base may be coated with a dielectric material and the coated base positioned between two metal plates or electrodes. The capacity of such a condenser is inversely proportional to the distance between the electrodes and directly proportional to the dielectric constant of the insulating medium, other factors being equal. It is, therefore, desirable to use a dielectric material in a thin, dense layer in order to provide high unit capacity and thus to minimize the required electrode area and ultimate size and cost of the condenser.

An object of the present invention is to provide a condenser dielectric in the form of a thin sheet having a high dielectric constant, and having improved operating characteristics.

In accordance with one embodiment of this invention, a sheet of polystyrene may be coated with titanium dioxide crystals suspended in polyvinyl alcohol, the coating dried, the coated polystyrene calendered to compact the coating, and then heated to burn off both the polystyrene and the polyvinyl alcohol and to fuse the titanium dioxide crystals, thus forming a ceramic dielectric body.

Figure 1:
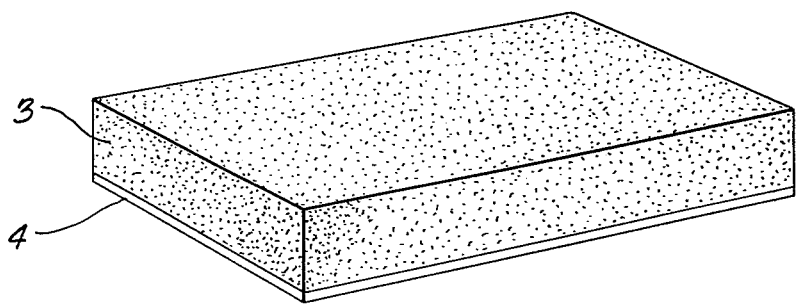
Figure 2:
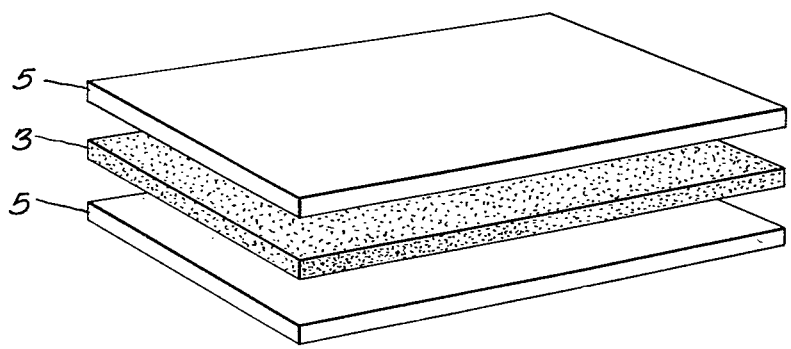

Other objects and advantages of this invention will be apparent from the following detailed description taken in conjunction with the following drawing wherein:

Fig. 1 is a perspective view of a dielectric material coated on a temporary support in accordance with one embodiment of this invention, and Fig. 2 is an exploded perspective view of a condenser having a dielectric body made in accordance with one embodiment of this invention.

Certain crystalline materials possess very high dielectric constants in comparison with paper or mica. Titanium dioxide crystals have a specific inductive capacity as high as 170 along their principal or major axis and approximately 90 along their transverse axis. A random or unoriented mixture of titanium dioxide crystals has a dielectric constant of about 110. However, the use of titanium dioxide crystals as a dielectric material is subject to certain limitations. One primary limitation has been the difficulty in applying the titanium dioxide to the condenser electrodes in a sufficiently thin and dense layer. Also, it has been necessary to make the ceramic bodies relatively thick in order to provide sufficient strength for handling in their unfired form. Thus, low area-volume ratio results, reducing the condenser capacity proportionately.

The capacity of a condenser depends in part on the dielectric constant of the dielectric material. Thus, with a material such as titanium dioxide, which has a very high dielectric constant, it is desirable for some applications to use it alone rather than to mix it with a binder which may have a much lower dielectric constant. In order to accomplish this, the titanium dioxide must be put in a form in which it can be used and since the crystals are powdery and have little cohesion among themselves, some means for binding them together must be employed. Polyvinyl alcohol swells to many times its dry size when immersed in water and large weight percentages of titanium dioxide may be dispersed in aqueous solutions of polyvinyl alcohol to form relatively stable suspensions. On drying, the polyvinyl alcohol shrinks, and the titanium dioxide crystals are closely bound together to form an extremely dense body. The density of this body may be further increased by calendering or pressing to compact it and thus to form a non-friable body, which on drying, will have an extremely high dielectric constant coupled with a low loss factor and high resistivity.

In accordance with one form of this invention, 100 grams of polyvinyl alcohol dissolved in 1900 cc. of water may be mixed in a ball mill or other suitable mixing device with 1600 grams of titanium dioxide. In this way, a paste is obtained which may be thinned out by the addition of more water to produce a coating material 3 which may be poured on a flat smooth surface 4, as shown in Fig. 1, such as a sheet of polystyrene, or other readily combustible material, to form a coating thereover. The thickness of the coating can be controlled by increasing or decreasing the amount of water added to the paste. If approximately 1000 cc. of water be added, a coating approximately .01" thick may be obtained. After coating, the composite strip is dried and calendered or pressed to compact the coating, the polystyrene serving as a support for the dielectric material. A reduction in volume of 40% to 60% may thus be obtained with a consequent proportionate gain in effective dielectric constant since the density of the body is proportionately increased. The coated and compacted strip may then be heated in a furnace to burn off the supporting strip of polystyrene and the polyvinyl alcohol binder and at the same time to fuse the titanium dioxide crystals into a thin, dense ceramic dielectric body. Satisfactory results have been obtained by heating for 18 hours at 2300° F. This body may then be placed between two metal electrodes 5 to form a condenser as shown in Fig. 2.

While but one embodiment of this invention has been shown and described, it will be understood that changes and modifications may be made therein without departing from the spirit and scope of the present invention.

What is claimed is:

1. A ceramic dielectric body for an electrostatic condenser composed of titanium dioxide crystals compacted and fused to form a body not greater than .006" in thickness and having a relatively high dielectric constant.

2. A method of making a dielectric material for an electrostatic condenser comprising coating titanium dioxide crystals suspended in an aqueous solution of polyvinyl alcohol on a combustible base, and then heating the coated base to remove the polyvinyl alcohol and the base and to fuse the titanium dioxide.

3. A method of making a dielectric body for an electrostatic condenser comprising coating titanium dioxide crystals suspended in an aqueous solution of polyvinyl alcohol on a combustible base, calendering such coated base to compact the coating, and then heating the coated base to remove the polyvinyl alcohol and the base and to fuse the titanium dioxide to form a dielectric body.

4. A method of making a dielectric material for an electrostatic condenser comprising coating titanium dixodie crystals suspended in an aqueous solution of polyvinyl alcohol on a polystyrene base, and then heating the coated base to remove the polyvinyl alcohol and the base, and to fuse the titanium dioxide.

5. A method of making a dielectric body for an electrostatic condenser comprising coating titanium dioxide crystals suspended in an aqueous solution of polyvinyl alcohol on a polystyrene base, calendering said coated base to compact the coating, and then heating the coated base to remove the polyvinyl alcohol and the base and to fuse the titanium dioxide to form a dielectric body.

6. A composite sheet for forming a ceramic dielectric body comprising a base of polystyrene, and an adherent layer of titanium dioxide and binder on said base.

7. A composite sheet for forming a dielectric body comprising a base of polystyrene and an adherent layer of titanium dioxide on said base.

8. A composite sheet for forming a dielectric body comprising a base of polystyrene and an adherent layer of dielectric material on said base.

9. A composite sheet for forming a dielectric body comprising a base of polystyrene and an adherent layer of a material having a substantially higher dielectric constant over said base.

10. A composite sheet for forming a dielectric body comprising a base of polystyrene and an adherent layer of a material having a substantially higher dielectric constant over said base, and a binder for said material.

JUDSON N. DETRICK.
HAL F. FRUTH.